United States Patent
Visel et al.

(10) Patent No.: US 6,359,034 B1
(45) Date of Patent: Mar. 19, 2002

(54) PREPARATION OF ELASTOMER REINFORCED WITH IN SITU FORMED SILICA AND TIRE HAVING COMPONENT THEREOF

(75) Inventors: Friedrich Visel, Bofferdange; Wolfgang Lauer, Mersch; Uwe Ernst Frank, Marpingen; Rene Jean Zimmer, Howald, all of (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/521,796

(22) Filed: Mar. 9, 2000

(51) Int. Cl.⁷ ............................ C08K 9/063; C08K 9/34
(52) U.S. Cl. .................... 523/212; 428/446; 152/209.1; 156/114; 524/492; 524/264; 524/262; 524/265
(58) Field of Search ................. 428/446; 152/209.1; 156/114; 523/212; 524/492, 264, 262, 265

(56) References Cited

U.S. PATENT DOCUMENTS

| | | | | |
|---|---|---|---|---|
| 6,156,822 A | * | 12/2000 | Materne et al. | |
| 6,166,108 A | * | 12/2000 | Materne et al. | |
| 6,172,138 B1 | * | 1/2001 | Materne et al. | |

FOREIGN PATENT DOCUMENTS

| | | | | |
|---|---|---|---|---|
| EP | 1002836 | 5/2000 | ............ | C08L/21/00 |
| JP | 6116440 | 4/1994 | ............ | C08L/21/00 |
| JP | 6145429 | 5/1994 | ............ | C08L/21/00 |
| JP | 9048880 | 2/1997 | ............ | C08L/21/00 |
| JP | 9302152 | 11/1997 | ............ | C08L/21/00 |

OTHER PUBLICATIONS

"Effect of Catalyst on In Situ Silica Reinforcement of Styrene Butadiene Rubber Vulcanizate by the Sol–gel Reaction of Tetraethoxysilane" by Y. Ikeda, A. Tanaka, S. Kohjiya as published in the *Journal of Materials Chemistry*, vol. 7, No. 3, Mar. 1, 1997. pp. 455 through 458; XP000693116.

European Search Report.

"Precipitation of Silica–Titania Mixed–Oxide Fillers Into Poly (dimethylsiloxane) Networks" by J. Wen and J. Mark, *Rubber Chemistry and Technology*, vol. 67, No. 5, pp. 806–819.

"The Effect of Bis(3–triethoxysilylpropyl) Tetrasulfide on Silica Reinforcement of Styrene–Butadiene Rubber" by Hashim et al, *Rubber Chemistry and Technology*, vol. 71, pp. 289–299.

* cited by examiner

*Primary Examiner*—Margaret G. Moore
*Assistant Examiner*—Kuo-Liang Peng
(74) *Attorney, Agent, or Firm*—Henry C. Young, Jr.

(57) ABSTRACT

This invention relates to preparation of an elastomer which contains a dispersion of silica reinforcement by forming a silica reinforcement in situ within an unvulcanized elastomer host, the resulting elastomer/filler composite and tire having component which contains such reinforced elastomer. The invention includes a rubber composition of at least two elastomers wherein one of said elastomers is a pre-formed composite of elastomer/in situ formed silica reinforcement. A tire having a component of such rubber composition, particularly a tire tread, is specifically contemplated.

16 Claims, No Drawings

PREPARATION OF ELASTOMER REINFORCED WITH IN SITU FORMED SILICA AND TIRE HAVING COMPONENT THEREOF

FIELD

This invention relates to preparation of an elastomer which contains a dispersion of silica reinforcement by forming a silica reinforcement in situ within an unvulcanized elastomer host, the resulting elastomer/filler composite and tire having component which contains such reinforced elastomer. The invention includes a rubber composition of at least two elastomers wherein one of said elastomers is a pre-formed composite of elastomer/in situ formed silica reinforcement. A tire having a component of such rubber composition, particularly a tire tread, is specifically contemplated.

BACKGROUND OF THE INVENTION

Elastomers are conventionally reinforced with particulate reinforcing fillers such as, for example, carbon black and sometimes precipitated silica.

It is sometimes difficult to obtain an adequate, homogeneous dispersion of silica in the rubber composition, by conventionally blending amorphous silica with unvulcanized rubber under high shear mixing conditions. Such difficulty may be, for example, because of a typically large difference in polarity and hydrophobicity between conjugated diene-based elastomers and precipitated silica, the silica may tend to agglomerate, or clump, together to form small domains of silica aggregates within the elastomer instead of widely disperses silica aggregates, or particles.

Accordingly, it is sometimes desired to more effectively create a homogeneous dispersion of the silica particles within the rubber composition.

Historically, alternate methods of creating a dispersion of silica in various elastomers has been suggested without simply dry blending precipitated silica and rubber under high shear and relatively high temperature conditions.

Historically, dispersing of silica in polysiloxane polymers such as poly(dimethylsiloxane), or (PDMS), elastomer(s) has been suggested by in-situ formation of silica from a base-catalyzed sol-gel conversion of tetraethoxysilane (TEOS). For example see "Precipitation of Silica-Titania Mixed-Oxide Fillers Into Poly(dimethylsiloxane) Networks" by J. Wen and J. Mark; Rubber Chem and Tech, (1994), volume 67, No.5, (pages 806–819).

Historically, a process of preparing rubber products has been suggested by mixing the TEOS with a solution of unvulcanized rubber in an organic solvent and subjecting it to a sol-gel condensation reaction to provide a finely powdered, spherically shaped, silica within the rubber. For example, see Japanese patent application publication 93/02152.

Historically, a composition has been suggested which comprises a rubber and globular silica made by a sol-gel method and having an average particle diameter of 10–30 microns and specific surface area of 400–700 square meters per gram. The composition is suggested for use in a flap of a tire. For example, see Japanese patent application publication 6145429.

Historically, a tread rubber composition has been proposed as a composition of rubber and spherical silica prepared by a sol-gel transformation. For example, see Japanese patent application publication 6116440 and corresponding Japanese patent publication 2591569.

Historically, an in-situ formation of silica from a sol gel reaction of TEOS in an organic solution of styrene/butadiene rubber, onto which a bis(3-triethoxysilylpropyl) tetrasulfide has been previously grafted to form triethoxysilyl groups, has been reported. ("The Effect of Bis(3-triethoxysilylpropyl) Tetrasulfide on Silica Reinforcement of Styrene-Butadiene Rubber" by Hashim, et al, in Rubber Chem & Tech, 1998, Volume 71, pages 289–299).

However, it is envisioned herein that it would be advantageous to create a relatively homogeneous particulate silica dispersion within an elastomer of a very small silica particle size which is not predominately spherical in shape.

In the description of this invention, the term "phr" where used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

SUMMARY AND PRACTICE OF THE INVENTION

In accordance with this invention, a method is provided of preparing an elastomer/silica composite as a dispersion of a filler formed in-situ within an elastomer host via a condensation reaction of TEOS and an additional organosilane, by (A) blending with an organic solvent solution of at least one diene hydrocarbon based elastomer containing 100 parts by weight (phr) of said elastomer;
  (1) an organic solvent solution of said TEOS containing about 0.5 to about 50, alternately about 5 to about 30, phr of said TEOS;
  (2) an organic solvent solution of said additional organosilane containing about 0.5 to about 25 phr of said organosilane;
  (3) a catalytic amount of condensation reaction promoter for said TEOS and said additional organosilane and a sufficient amount of water to facilitate said condensation reaction, followed by (B) recovering a composite of said elastomer and dispersion therein of an in situ formed condensation reaction product of said TEOS and additional organosilane; wherein said blending process comprises:
  (1) substantially simultaneously blending said TEOS solution and said additional organosilane solution with said elastomer solution following which said condensation promoter and water are added, or
  (2) first blending said TEOS solution with said elastomer solution, following which said condensation promoter and water are added and subsequently blending said additional organosilane solution therewith; wherein said additional organosilane is of the following general formula (I), (II), (III), or (IV).

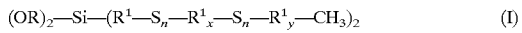

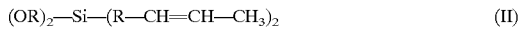

wherein Z is selected from;

—CH=CH—CH$_3$ (Z1)

—CH$_2$—CH=CH$_2$ (Z2)

—CH$_2$—CH$_2$—C—(CH$_3$)$_3$, (Z3)

or

—(CH$_2$)$_2$—O—(CH$_2$)$_2$—O—CH$_2$—CH$_3$ (Z4)

(OR)$_3$—Si—R$^1$—S$_n$—R$^1$—Si—(OR)$_3$ (IV)

wherein R is an alkyl radical selected from at least one of methyl and ethyl radicals, preferably a methyl radical, R$^1$ is an alkyl radical selected from ethyl, propyl and butyl radicals, y is a value of 1 to and including 4, x is a value of 2 to and including 3, y is preferably a value of 2 to and including 3, and n is an average of 2 to and including 2.6 or of 3.5 to and including 4. Representative examples of Formulas (I) to (IV) are, for example:

(C$_2$H$_5$O)$_2$—Si—[(CH$_2$)$_x$—S$_n$—(CH$_2$)$_x$CH$_3$)]$_2$; (I)

(C$_2$H$_5$O)$_2$—Si—[(CH$_2$—CH=CH—CH$_3$)]$_2$; (II)

(C$_2$H$_5$O)$_2$—Si—[(CH$_2$—CH$_2$—C(CH$_3$)$_3$]$_2$ (III)(Z3)

(C$_2$H$_5$O)$_2$—Si—[(CH$_2$)$_2$—O—(CH$_2$)$_2$—O—C$_2$H$_5$]$_2$ (III)(Z4)

(C$_2$H$_5$O)$_3$—Si—(CH$_2$)$_3$—S$_n$—(CH$_2$)$_3$—Si—(C$_2$H$_5$O)$_3$ (IV)

In practice, said elastomer host is preferably selected from at least one of homopolymers of conjugated dienes, copolymers of conjugated dienes, copolymers of conjugated diene with a vinyl aromatic compound, preferably selected from styrene and alpha-methylstyrene and more preferably styrene.

Significantly, where the solutions of TEOS and additional organosilane are substantially added to elastomer solution, filler is formed in situ within said elastomer host by a condensation reaction of said TEOS in combination with said additional organosilane.

This is considered herein to be significant, and a departure of simply creating a filler in situ within an elastomer host by a condensation of TEOS alone. The silane and thiasilane networks are a different created simultaneously in contract to the in situ formed reinforcement fillers derived from TEOS alone.

Alternatively, where the TEOS solution is first added to the elastomer solution, followed by the condensation promoter and then the additional organosilane is added, it is considered therein that the additional organosilane substantially reacts with condensation product of the TEOS or may form its own siloxane or thiosilane network.

This is considered herein to be significant as being different from a simultaneous blending of TEOS and organosilane in the elastomer host method.

A significant aspect of the invention is considered that it is contemplated that the resultant filler formed within the elastomer host by the practice of this invention is not spherical in shape, at least as compared to using the TEOS alone, and, by using a dilute solution, the in situ formed filler particles also have a higher surface area to volume of the particle as compared to using the TEOS alone.

Further, due to the functional groups of the organosilane, the resultant filler particles have a higher reactivity and better compatibility with the surrounding elastomer host.

Also, significantly, dilute solvent solutions of all of the said TEOS, additional organosilane and elastomer are used to form the blend. This is significant in order to form the nano-sized filler particles within the elastomer host.

In practice, various solvents may be used for the aforesaid organic solvent solutions, representative of which are, for example, tetrahydrofuran, toluene, cyclohexane and hexene.

In additional accordance with this invention, an article is provided having at least one component comprised of said rubber composition.

In further accordance with this invention, said article is selected from industrial belts and hoses.

In additional accordance with this invention, a tire is provided having at least one component comprised of said rubber composition.

In further accordance with this invention, a tire is provided having a tread comprised of said rubber composition.

In practice, it is preferred that a concentration of the elastomer solution is within a range of about 5 to about 35 weight percent of the elastomer.

In practice, it is preferred that a concentration of the TEOS solution is within a range of about 0.5 to about 30 weight percent of the elastomer.

In practice, it is preferred that a concentration of the additional organosilane solution is within a range of about 0.5 to about 20 weight percent of the elastomer.

It is considered herein that the significance of utilization of dilute solutions, particularly of the TEOS, is to form very small silica particles in the solvent matrix and therefore within the elastomer host.

It is envisioned herein that a relatively small size, homogeneous dispersion of silica particles is encouraged by the process of this invention because it is contemplated that very small, nanoparticle size (e.g. about 5 to about 25 nanometers average diameter particle size ) silica particles can be achieved which promote a better dispersion, compatibility and interaction within the elastomer host.

It is therefore considered herein that the utilization of the prescribed dilute solvent mixtures promotes the formation of small silica particles within the unvulcanized elastomer host such as, for example, silica particles of an average particle diameter in a range of from about 3 to about 25 nanometers (nm) and more preferably in a range of about 5 to about 10 nm.

While a sol gel condensation type of process of forming particulate silica is utilized, the practice of this invention significantly departs what is believed to be past practice because the formation of the particulate silica filler occurs in the presence of a dilute elastomer solution resulting in particularly well dispersed small, nanoparticle size, silica particles within the elastomer host which are relatively non-spherical, irregular shaped silica particles through use of the said organosilane.

Representative of organosilanes of formula (I) is, for example, diethoxy-di(2,4-dithioheptyl) silane.

Representative of organosilanes of formula (II) is, for example, diethoxy-dibutenyl(2)silane.

Representative of organosilanes of formula (II)(Z3) is, for example, diethoxy-di-isopentylsilane.

Representative of organosilanes of formula (II)(Z4) is, for example, diethoxy-di-(2,6 dioxohexyl)silane.

Representative of organosilanes of formula (IV) is, for example, bis(triethoxysilylpropyl) tetrasulfide.

In the practice of this invention, various of well known condensation reaction promoters are contemplated such as for example, isobutylamine, potassium hydroxide, hydrochloric acid and ammonia. Usually the isobutylamine is preferred.

In practice, various additional reinforcing fillers may also be subsequently mixed with the elastomer/in-situ formed reinforcing filler composite, usually under high shear conditions.

For example, such additional fillers may be carbon black, precipitated silica and other fillers containing hydroxyl groups on their surface such as, for example, aluminum doped precipitated silica and modified carbon blacks, which would have aluminum hydroxide and/or silicon hydroxide on their respective surfaces.

Exemplary of such aluminum doped precipitated silicas are, for example aluminosilicates formed by a co-precipitation of a silicate and an aluminate. An example of modified carbon black is, for example, a carbon black having silicon hydroxide on its outer surface by treatment of carbon black with an organosilane at an elevated temperature or by co-fuming an organosilane and oil at an elevated temperature.

In further accordance with this invention, an elastomer composition is provided which is comprised of at least one elastomer/silica composite of this invention as well as a blend thereof with least one additional diene-based elastomer.

For example, an elastomer blend composition is provided which is comprised of at least two diene-based elastomers of which one elastomer is a pre-formed elastomer/silica composite of this invention, based on 100 phr of elastomers (A) about 10 to about 90 phr of at least one diene-based elastomer selected from at least one homopolymer and copolymer of isoprene and 1,3-butadiene and copolymer of at least one diene selected from isoprene and 1,3-butadiene with a vinyl aromatic compound selected from at least one of styrene and alpha-methylstyrene, preferably styrene;

(B) about 90 to about 10 phr of at least one of said pre-formed composite of elastomer/filler;

(C) at least one of additional reinforcing filler provided, however, that the total of said in-situ formed filler and said additional reinforcing filler are present in an amount of from about 30 to about 120 phr and where said additional reinforcing filler may be selected, for example, from at least one of precipitated silica, aluminosilicate, carbon black and modified carbon black having hydroxyl groups, eg: hydroxyl and/or silicon hydroxide groups, on its surface; and (D) optionally a coupling agent having a moiety reactive with said filler(s) and another moiety interactive with said elastomer(s).

In further accordance with this invention, an article of manufacture is provided having at least one component comprised of the elastomer/silica composite of this invention or a rubber composition comprised of a blend thereof with at least one additional elastomer, particularly a diene-based elastomer.

In additional accordance with this invention, an article selected from industrial hoses and belts, particularly conveyor belts and power transmission belts is provided having at least one component comprised of the elastomer/silica composite of this invention or a rubber composition comprised of a blend thereof with at least one other elastomer, particularly a diene based elastomer.

In further accordance with this invention, a tire is provided having at least one component comprised of the elastomer/silica composite of this invention or a composition comprised of a blend thereof and at least one additional elastomer, particularly a diene based elastomer.

In additional accordance with this invention, a tire is provided having a tread comprised of said elastomer/silica composite of this invention or a composition comprised of a blend thereof and at least one additional elastomer, particularly a diene based elastomer.

In practice the diene-based elastomer(s) are contemplated as being selected from, for example, homopolymers and copolymers of monomers selected from isoprene and 1,3-butadiene and copolymers of monomers selected from at least one of isoprene and 1,3-butadiene with an aromatic vinyl compound selected from styrene and alpha-methylstyrene, preferably styrene, and mixtures thereof Representative of such elastomers, particularly for elastomer (A) are, for example, cis 1,4-polyisoprene, cis 1,4-polybutadiene, isoprene/butadiene copolymers, styrene/butadiene copolymers including emulsion polymerization prepared copolymers and organic solvent solution polymerization prepared copolymers, styrene/isoprene copolymers, 3,4-polyisoprene, trans 1,4-polybutadiene, styrene/isoprene/butadiene terpolymer, high vinyl polybutadiene having from about 35 to about 90 percent vinyl groups, and mixtures thereof.

Representative of elastomer components for elastomer (B) are, for example, organic solution polymerization prepared cis 1,4-polyisoprene, cis 1,4-polybutadiene, isoprene/butadiene copolymers, styrene/butadiene copolymers, styrene/isoprene copolymers, 3,4-polyisoprene, trans 1,4-polybutadiene and styrene/isoprene/butadiene terpolymers, and mixtures thereof In practice, the diene-based elastomer may be provided in an organic solvent solution by, for example, (A) dissolving the elastomer in a suitable organic solvent, such as for example, toluene, hexane, cyclohexane or THF (tetrahydrofurane); or (B) by providing the elastomer as a cement, or polymerizate, namely in the solution resulting from an organic solvent solution polymerization of appropriate monomers to provide the elastomer in solution.

Such organic solvent solution polymerization of monomers to obtain elastomers is well known to those having skill in such art.

Classical rubber-reinforcing carbon blacks considered for use in this invention, including carbon blacks used for preparation of the carbon black composite, are, for example, carbon blacks having an Iodine Adsorption Number (ASTM test D1510) in a range of about 30 to about 180 and sometimes even up to about 250 g/kg and a DBP (dibutylphthalate) Adsorption Number (ASTM test D2414) in a range of about 20 to about 150 cm3/100 g. Representative examples of such carbon blacks, and references to associated ASTM test methods, may be found, for example, in The Vanderbilt Rubber Handbook, 1990 edition on pages 416 to 418.

The resultant physical properties obtained for rubber compositions of this will depend somewhat upon the carbon black composite used, the coupler used and the rubber composition itself.

The rubber composite itself can also be provided as being a sulfur cured composition through vulcanization of the uncured elastomer composition. The sulfur curing is accomplished in a conventional manner, namely, by curing under conditions of elevated temperature and pressure for a suitable period of time.

The curatives for sulfur curing the rubber composition are curatives conventionally used for sulfur curable elastomers which typically include sulfur and one or more appropriate cure accelerators and sometimes also a retarder. Such curatives and use thereof for sulfur curable elastomer compositions are well known to those skilled in the art.

Sequential mixing processes for preparing sulfur curable rubber compositions in which elastomers and associated ingredients exclusive of curatives are first mixed in one or more sequential steps, usually called a "non-productive mixing step(s)" followed by a final mixing step for adding curatives, usually called a "productive mixing step", are also well known to those skilled in the art.

In the practice of this invention, additional diene-based elastomers can be blended with the aforesaid elastomer composition such as homopolymers and copolymers of conjugated dienes and copolymers of conjugated diene(s) and vinyl aromatic compound. Such dienes may, for example, be selected from isoprene and 1,3-butadiene and such vinyl aromatic compounds may be selected from styrene and alpha-methylstyrene. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), high vinyl polybutadiene rubber having from about 35 to about 90 percent vinyl 1,2-content and emulsion polymerization prepared butadiene/acrylonitrile copolymers.

As hereinbefore discussed, it is to be appreciated that additional silica, particularly precipitated silica, and/or carbon black might also be blended with the said composite of pre-formed reinforced elastomer and additional elastomer (s).

It is intended for the practice of this invention that the term "precipitated silica", when used herein, also includes precipitated aluminosilicates as a form of precipitated silica. The precipitated silicas are, for example, those obtained by the acidification of a soluble silicate, e.g., sodium silicate, generally exclusive of silica gels.

Such silicas might be characterized, for example, by having a BET surface area, as measured using nitrogen gas, preferably in the range of about 40 to about 600, and more usually in a range of about 50 to about 300 square meters per gram ($m^2/g$). The BET method of measuring surface area is described by Brunauer, Emmett and Teller: *Journal of American Chemical Society* (1938) Page 309. An additional reference might be DIN Method 66131.

The silica may also be typically characterized by having a DBP (dibutylphthalate) Absorption Number in a range of about 100 to about 400, and more usually about 150 to about 300 cc/100 g.

Various commercially available precipitated silicas may be considered for use in this invention such as, only for example herein, and without limitation, silicas commercially available from PPG Industries under the Hi-Sil trademark with designations 210, 243, etc; silicas available from Rhodia with, for example, designation of Zeosil 1165MP and silicas available from Degussa AG with, for example, designations VN2 and VN3, BV3380GR, etc. and from Huber as Zeopol 8745.

Various couplers may be used and many are well known to those skilled in such art. For example bis (trialkoxysilylalkyl) polysulfides may be used which contain from two to about eight sulfur atoms in their polysulfidic bridge, with an average of about 2 to about 5 sulfur atoms. For example, the polysulfidic bridge may contain an average of from about 2 to 3 or 3.5 to 5 sulfur atoms. The alkyl groups may be selected, for example, from methyl, ethyl, and propyl groups. Therefore, a representative coupler might be, for example, a bis(triethoxysilylpropyl) polysulfide containing from 2 to 8, with an average of about 2 to about 5, sulfur atoms in its polysulfidic bridge.

It is to be appreciated that the coupler, if in a liquid form, might be used in conjunction with a carbon black carrier, namely, pre-mixed with a carbon black prior to the addition to the rubber composition, and such carbon black is usually to be included in the amount of carbon black accounted for in the rubber composition formulation.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

In the preparation of the rubber composition typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others such as, for example, those disclosed in The Vanderbilt Rubber Handbook (1978), pages 344–346. Typical amounts of antiozonants comprise about 1 to 5 phr.

Typical amounts of fatty acids, if used, which can include stearic acid, palmitic acid, linoleic acid or mixtures of one or more fatty acids, can comprise about 0.5 to about 5 phr.

Often stearic acid is used in a relatively impure state and is commonly referred to in the rubber compounding practice as "stearic acid" and is so referred to in the description and practice of this invention.

Typical amounts of zinc oxide comprise about 1 to about 5 phr. Typical amounts of waxes comprise about 1 to about 5 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above ingredients, other than carbon black and coupler, are not considered to be the primary subject of this invention which is more primarily directed to the preparation and use of the aforesaid pre-formed elastomer composite with the integral silica dispersion.

The ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage (s). The rubber, carbon black and coupling agent if used, are mixed in one or more non-productive mix stages. The terms "non-productive" and "productive" mix stages are well known to those having skill in the rubber mixing art.

In at least one of the non-productive (NP) mixing stages, the materials are thermomechanically mixed and the mixing temperature is allowed to reach a temperature of, for example, between 140° C. and 190° C.

The rubber composition of this invention can be used for various purposes. For example, it can be used for various tire compounds. Such tires can be built, shaped, molded and cured by various methods which are known and will be readily apparent to those having skill in such art.

While certain representative embodiments and details have been shown for the purpose of illustrating the invention, it will be apparent to those skilled in this art that various changes and modifications may be made therein without departing from the spirit or scope of the invention.

What is claimed is:

1. A tire having at least one component of an elastomer composition comprised of an elastomer/silica composite as a dispersion of a filler formed in-situ within an elastomer host via a condensation reaction of tetraethoxysilane (TEOS) and an additional organosilane which comprises
    (A) obtaining with an organic solvent solution of at least one diene hydrocarbon based elastomer containing 100 parts by weight (phr) of said elastomer;
    (B) blending with said elastomer solution:
        (1) an organic solvent solution of TEOS;
        (2) an organic solvent solution of said additional organosilane;
        (3) catalytic amount of condensation reaction promoter for said TEOS and said additional organosilane and a sufficient amount of water to facilitate said condensation reaction, followed by
    (C) recovering a composite of said elastomer and dispersion therein of an in situ formed condensation reaction product of said TEOS and additional organosilane; wherein the concentrations of said elastomer, TEOS and additional organosilane in their individual organic solvent solutions/dispersions are
        (1) about 5 to about 35 weight percent for said elastomer(s);
        (2) about 0.5 to about 30 weight percent for said TEOS; and
        (3) about 0.5 to about 20 weight percent for said additional organosilane;
    wherein said blending process comprises first blending said TEOS solution with said elastomer solution, following which said condensation promoter and water are added and subsequently, prior to the completion of a resulting condensation reaction of said TEOS, blending said additional organosilane solution therewith; wherein said additional organosilane is of the following general formula (I), (II), (III), or (IV):

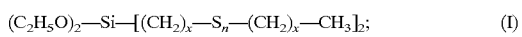

$(C_2H_5O)_2$—Si—$[(CH_2)_x$—$S_n$—$(CH_2)_x$—$CH_3]_2$;  (I)

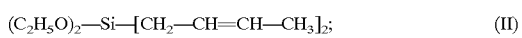

$(C_2H_5O)_2$—Si—$[CH_2$—CH=CH—$CH_3]_2$;  (II)

$(C_2H_5O)_2$—Si—$[CH_2$—$CH_2C(CH_3)_3]_2$  (III)(Z3)

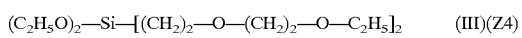

$(C_2H_5O)_2$—Si—$[(CH_2)_2$—O—$(CH_2)_2$—O—$C_2H_5]_2$  (III)(Z4)

wherein n is an average of 2 to and including 2.6 or of 3.5 to and including 4.

2. The tire of claim 1 wherein said additional organosilane is the organosilane of Formula (I).

3. The tire of claim 1 wherein said additional organosilane is the organosilane of Formula (III) (Z3).

4. The tire of claim 1 wherein said additional organosilane is the organosilane of Formula (III) (Z4).

5. The tire of claim 1 wherein said additional organosilane is the organosilane of Formula (IV).

6. The tire of claim 1 wherein said additional organosilane is selected from at least one of the additional organosilane of formula (II), formula (III)(Z3) and formula (III)(Z4).

7. The tire of claim 1 wherein said elastomer composition is comprised of, based on 100 phr of elastomers,
    (A) about 10 to about 90 phr of said elastomer/silica composite;
    (B) about 90 to about 10 phr of at least one diene-based elastomer selected from at least one homopolymer and copolymer of isoprene and 1,3-butadiene and copolymer of at least one diene selected from isoprene and 1,3-butadiene with a vinyl aromatic compound selected from at least one of styrene and alpha-methylstyrene;
    (C) at least one of additional reinforcing filler provided, however, that the total of said in-situ formed filler and said additional reinforcing filler are present in an amount of from about 30 to about 120 phr and where said additional reinforcing filler is selected from at least one of precipitated silica, aluminosilicate, and carbon black; and
    (D) optionally a coupling agent having a moiety reactive with said filler(s) and another moiety interactive with said elastomer(s).

8. The tire of claim 5 wherein said elastomer composition is comprised of, based on 100 phr of elastomers,
    (A) about 10 to about 90 phr of said elastomer/silica composite;
    (B) about 90 to about 10 phr of at least one diene-based elastomer selected from at least one homopolymer and copolymer of isoprene and 1,3-butadiene and copolymer of at least one diene selected from isoprene and 1,3-butadiene with styrene;

(C) at least one of additional reinforcing filler provided, however, that the total of said in-situ formed filler and said additional reinforcing filler are present in an amount of from about 30 to about 120 phr and where said additional reinforcing filler is selected from at least one of precipitated silica, aluminosilicate, and carbon black; and (D) optionally a coupling agent having a moiety reactive with said filler(s) and another moiety interactive with said elastomer(s).

9. The tire of claim 6 wherein said elastomer composition is comprised of, based on 100 phr of elastomers, (A) about 10 to about 90 phr of said elastomer/silica composite;

(B) about 90 to about 10 phr of at least one diene-based elastomer selected from at least one homopolymer and copolymer of isoprene and 1,3-butadiene and copolymer of at least selected from isoprene and 1,3-butadiene with styrene; and (C) at least one of additional reinforcing filler provided, however, that the total of said in-situ formed filler and said additional reinforcing filler are present in an amount of from about 30 to about 120 phr and where said additional reinforcing filler is selected from at least precipitated silica.

10. The tire of claim 1 wherein said tire component is a tire tread.

11. The tire of claim 2 wherein said tire component is a tire tread.

12. The tire of claim 5 wherein said tire component is a tire tread.

13. The tire of claim 6 wherein said tire component is a tire tread.

14. The tire of claim 7 wherein said tire component is a tire tread.

15. The tire of claim 8 wherein said tire component is a tire tread.

16. The tire of claim 9 wherein said tire component is a tire tread.

\* \* \* \* \*